United States Patent
Jeanne et al.

(10) Patent No.: US 10,713,206 B2
(45) Date of Patent: Jul. 14, 2020

(54) METHOD FOR OPERATING A DEVICE IN ONE OF MULTIPLE POWER MODES AND CORRESPONDING DEVICE, SYSTEM, COMPUTER READABLE PROGRAM PRODUCT AND COMPUTER READABLE STORAGE MEDIUM

(71) Applicant: INTERDIGITAL CE PATENT HOLDINGS, SAS, Paris (FR)

(72) Inventors: Ludovic Jeanne, Montreuil sur Ille (FR); Jean-Pierre Bertin, Guemene-Penfao (FR); Pascal Maetz, Montgermont (FR); Patrick Colin, Cesson-Sévigné (FR)

(73) Assignee: INTERDIGITAL CE PATENT HOLDINGS, SAS, Paris (FR)

( * ) Notice: Subject to any disclaimer, the term of this patent is extended or adjusted under 35 U.S.C. 154(b) by 0 days.

(21) Appl. No.: 15/901,122

(22) Filed: Feb. 21, 2018

(65) Prior Publication Data
US 2018/0246841 A1    Aug. 30, 2018

(30) Foreign Application Priority Data
Feb. 24, 2017   (EP) .................................... 17305209

(51) Int. Cl.
*G06F 13/42*    (2006.01)
*G06F 1/26*     (2006.01)
(Continued)

(52) U.S. Cl.
CPC ............ *G06F 13/4282* (2013.01); *G06F 1/26* (2013.01); *G06F 1/266* (2013.01);
(Continued)

(58) Field of Classification Search
None
See application file for complete search history.

(56) References Cited

U.S. PATENT DOCUMENTS 7,024,567 B2 *   4/2006   Kim ....................... G06F 1/266
                                                713/300
7,231,473 B2     6/2007   Yen
(Continued)

FOREIGN PATENT DOCUMENTS

CA         2851983         8/2014
CN       102789301        11/2012
(Continued)

OTHER PUBLICATIONS

'Roku Streaming Stick—Let's get started' by copyright 2014 by Roku. (Year: 2014).*
(Continued)

*Primary Examiner* — Steven G Snyder
(74) *Attorney, Agent, or Firm* — Invention Mine LLC (57) ABSTRACT

A method to be implemented in a first communication device adapted to be powered via a first wired communication interface and to be configured as a master or as a slave device when connected with a second device via the first wired communication interface is described. The method includes, when the first communication device is connected to a second device via the first communication interface and is configured as a master device, with respect to the second device, obtaining an identifier of the second device and operating in a first operating mode, compatible with a first power consumption, or in a second operating mode, leading to a second power consumption higher than the first power consumption, depending of the obtained identifier. The corresponding device, system, computer readable program product and computer readable storage medium are also described.

21 Claims, 6 Drawing Sheets

(51) Int. Cl.
*G06F 13/40* (2006.01)
*H04N 21/41* (2011.01)
(52) U.S. Cl.
CPC ..... *G06F 13/4068* (2013.01); *H04N 21/4104* (2013.01); *Y02C 10/14* (2013.01); *Y02D 10/151* (2018.01)

(56) References Cited

U.S. PATENT DOCUMENTS

| | | | |
|---|---|---|---|
| 7,764,026 | B2 | 7/2010 | Dowling et al. |
| 7,890,783 | B2* | 2/2011 | Tupman ................ G06F 1/266 710/14 |
| 8,078,893 | B2* | 12/2011 | Umedu ................ G06F 1/266 713/320 |
| 8,350,522 | B2* | 1/2013 | Johnson ............... G06F 1/266 320/107 |
| 8,356,197 | B2 | 1/2013 | Allarey et al. |
| 8,447,890 | B1 | 5/2013 | Letourneur et al. |
| 8,450,873 | B2* | 5/2013 | Sugihara ................ G06F 1/26 307/31 |
| 8,578,031 | B2* | 11/2013 | Kobayashi ............. G06F 1/266 709/227 |
| 8,745,301 | B2 | 6/2014 | Hawawini et al. |
| 8,762,746 | B1* | 6/2014 | Lachwani ............. G06F 1/266 713/300 |
| 8,819,301 | B2* | 8/2014 | Lai ........................ H02J 7/0004 710/10 |
| 8,850,082 | B2 | 9/2014 | Malamant et al. |
| 8,890,469 | B2 | 11/2014 | Picard |
| 8,943,396 | B2 | 1/2015 | Basso et al. |
| 9,111,049 | B2* | 8/2015 | Lai ........................ H02J 7/0004 |
| 9,164,723 | B2 | 10/2015 | Geiger et al. |
| 9,268,381 | B2* | 2/2016 | He ......................... G06F 1/266 |
| 9,274,577 | B2 | 3/2016 | Lai et al. |
| 9,287,702 | B2* | 3/2016 | Proefrock .............. G06F 1/266 |
| 9,287,706 | B2* | 3/2016 | Brewer .................. H02J 3/00 |
| 9,298,236 | B2* | 3/2016 | Oler ........................ G06F 1/26 |
| 9,387,394 | B1 | 7/2016 | Johnson et al. |
| 9,436,253 | B2 | 9/2016 | Lee et al. |
| 9,448,259 | B2 | 9/2016 | Kulkarni et al. |
| 10,038,290 | B2* | 7/2018 | Chung ................. H01R 13/665 |
| 2002/0162036 | A1* | 10/2002 | Kim ........................ G06F 1/266 713/300 |
| 2005/0091693 | A1* | 4/2005 | Amine .................... H04N 7/18 725/100 |
| 2007/0143679 | A1 | 6/2007 | Resner |
| 2008/0052439 | A1 | 2/2008 | Young et al. |
| 2009/0193156 | A1* | 7/2009 | Suematsu .............. G06F 1/266 710/14 |
| 2010/0037038 | A1 | 2/2010 | Bieswanger et al. |
| 2010/0100200 | A1* | 4/2010 | Kim ..................... G06F 13/4022 700/12 |
| 2010/0235546 | A1* | 9/2010 | Terlizzi ................ G06F 13/426 710/16 |
| 2011/0148922 | A1 | 6/2011 | Son et al. |
| 2011/0221604 | A1* | 9/2011 | Johnson ................ G06F 1/266 340/664 |
| 2013/0082644 | A1 | 4/2013 | Gagne et al. |
| 2013/0088188 | A1 | 4/2013 | Romanenko |
| 2013/0094682 | A1 | 4/2013 | Lee et al. |
| 2013/0151731 | A1* | 6/2013 | Lai ....................... G06F 13/4068 710/3 |
| 2013/0151749 | A1* | 6/2013 | Lai ....................... G06F 13/4068 710/313 |
| 2013/0275779 | A1* | 10/2013 | He .......................... G06F 1/26 713/300 |
| 2013/0334883 | A1* | 12/2013 | Kim ......................... H02J 7/34 307/29 |
| 2014/0173141 | A1 | 6/2014 | Waters |
| 2014/0183974 | A1 | 7/2014 | Proefrock et al. |
| 2014/0354080 | A1* | 12/2014 | Sung ........................ H02J 4/00 307/125 |
| 2015/0058642 | A1* | 2/2015 | Okamoto ............... G06F 13/14 713/300 |
| 2016/0027212 | A1 | 1/2016 | Da Veiga et al. |
| 2016/0028250 | A1 | 1/2016 | Patnaik et al. |
| 2016/0330397 | A1* | 11/2016 | Wengreen ................ H04N 5/63 |
| 2016/0359322 | A1* | 12/2016 | Kim ......................... H02J 1/00 |
| 2017/0116146 | A1* | 4/2017 | Liu ....................... G06F 13/385 |
| 2018/0164869 | A1* | 6/2018 | Yuan ...................... G06F 1/266 |
| 2019/0064900 | A1* | 2/2019 | Lee ........................ G06F 1/266 |
| 2019/0101969 | A1* | 4/2019 | Gendler ............. G06F 12/0875 |

FOREIGN PATENT DOCUMENTS

| | | | | |
|---|---|---|---|---|
| CN | 103019352 | | 4/2013 | |
| CN | 103154922 | | 6/2013 | |
| CN | 104008083 | | 8/2014 | |
| EP | 3367210 | A1 * | 8/2018 | ............. G06F 1/266 |
| GB | 2527605 | | 12/2015 | |
| KR | 101552953 | | 9/2015 | |
| WO | WO2012125802 | | 9/2012 | |
| WO | WO2012138655 | | 10/2012 | |
| WO | WO2013052855 | | 4/2013 | |
| WO | WO2015089803 | | 6/2015 | |

OTHER PUBLICATIONS

'Roku debuts a new Streaming Stick with a quad-core processor, support for private listening' by Sarah Perez, Apr. 5, 2016. (Year: 2016).*

'On-The-Go and Embedded Host Supplement to the USB Revision 3.0 Specification Revision 1.1' May 10, 2012, Texas Instruments et al. (Year: 2012).*

'Universal Serial Bus Power Delivery Specification' Revision 2.0, V1.2, Mar. 2016. (Year: 2016).*

Anonymous, "Universal Serial Bus Specification", USB Implementors Forum, Revision 2.0, Apr. 27, 2000, pp. 1-650.

Anonymous, "Universal Serial Bus 3.1 Specification", USB Implementors Forum, Revision 1.0, Jul. 26, 2013, pp. 1-631.

Anonymous, "Universal Serial Bus 3.0 Specification", USB Implementors Forum, Revision 1.0, Jun. 6, 2011, pp. 1-531.

Anonymous, "On-The-Go Supplement to the USB 2.0 Specification", USB Implementors Forum, Revision 1.3, Dec. 5, 2006, pp. 1-53.

Ahn et al., "Flexible Framework for Dynamic Management of Multi-Core Systems", 2009 International SoC Design Conference (ISOCC 2009), Busan, South Korea, Nov. 22, 2009, pp. 237-240.

Chu et al., "Design a Low-Power Scheduling Mechanism for a Multicore Android System", 2012 Fifth International Symposium on Parallel Architectures, Algorithms and Programming (PAAP), Taipei, Taiwan, Dec. 17, 2012, pp. 25-30.

Gligor, M., "Fast Simulation Strategies and Adaptive DVFS Algorithm for Low Power MPSoCs", Doctoral Thesis, University of Grenoble, Grenoble, France, Sep. 9, 2010, pp. 1-173.

Lee et al., "Optimizing Throughput of Power- and Thermal-Constrained Multicore Processors Using DVFS and Per-Core Power-Gating", 2009 46th ACM/IEEE Design Automation Conference (DAC), San Francisco, California, USA, Jul. 26, 2009, pp. 47-50.

Toyama et al., "Energy Reduction Method by Multicore Processors during Execution of Multimedia Programs", Journal of the Institute of Image Information and Television Engineers, vol. 66, No. 3, Apr. 2012, pp. J74-J84. English Abstract.

* cited by examiner

METHOD FOR OPERATING A DEVICE IN ONE OF MULTIPLE POWER MODES AND CORRESPONDING DEVICE, SYSTEM, COMPUTER READABLE PROGRAM PRODUCT AND COMPUTER READABLE STORAGE MEDIUM

1. REFERENCE TO RELATED EUROPEAN APPLICATION

This application claims priority from European Patent Application No. 17305209.3, entitled "Method for Operating a Device and Corresponding Device, System, Computer Readable Program Product and Computer Readable Storage Medium", filed on 24 Feb. 2017, the contents of which are hereby incorporated by reference in its entirety.

2. TECHNICAL FIELD

The present disclosure relates to the field of communication devices, notably communication devices used for processing audio and/or video contents, like communication devices used for transmitting an audio and/or video content to a rendering device, like a TV, a display or an audio renderer.

A method for operating a device and corresponding device, system, computer readable program product and computer readable storage medium are described.

3. BACKGROUND ART

Local or domestic environments often encompass many communication devices, for processing (for instance acquiring, receiving, transmitting and/or rendering) an audio and/or video content. Such communication devices can include inter-communication devices (like gateways or repeaters), and end-devices like set-top-boxes (STB), smartphones, tablets, personal computers or peripherals like speakers (or audio renderers) or microphones that have become widely used nowadays.

With the increasing consumption of multimedia contents, it is often desirable for a user to be able to consume contents in an adaptive environment, like for instance in different rooms of a house, or to consume contents coming from different sources (like for instance distant sources accessible from the Internet or local storage medium). However, the processing capabilities of a device may sometimes be insufficient for providing technical features like video processing, to a user. Indeed, video processing, notably high definition video processing, can be very memory and Central Processing Unit (CPU) intensive. Thus, more and more very small devices can be equipped with a complementary device, adapted to enhance the processing capabilities of the device.

For such an adaptive environment, a device can be equipped, or associated, with one or more additional device(s) or complementary device(s) such as a dongle(s)) or other removable peripheral device, that enhance the processing capabilities of the device. Such an additional device can also provide additional processing capabilities such as audio/video processing capabilities, and/or wireless capabilities to a device. Such an additional device can be for instance an HDMI peripheral device.

The peripheral devices are usually connected via a wired communication port of the main device. The peripheral device can use the communication port for exchanging data with the main device and also for its operating power.

Such a communication port can be notably a port compliant to a standard communication interface like a USB interface or an HDMI interface.

The use of a standardized communication interface requires complying with requirements of the relevant standard such as power limitation requirements. For instance, the USB 2.0 standard requires a current limitation of 500 mA, and thus a power limitation of 2.5 W, with a voltage of 5V. USB 3.0 standard requires a limitation of 900 mA and thus a power limitation of 4.5 W with a voltage of 5V. However, some services of a peripheral processing device may be very greedy in terms of power, and thus a peripheral device may require a total consumption of more than 1 W for performing some services. The power limitation imposed by a standard may thus induce some limitations in the use of the peripheral device. For instance, it may not be possible to use all processing resources of the peripheral device at the same time.

Thus, there is need for a solution that permits enhancing the user experience of a peripheral device.

4. SUMMARY

The present principles enable at least one of the above disadvantages to be resolved by proposing a method, to be implemented in a first communication device adapted to be powered via a wired first communication interface and to be configured as a master or as a slave device, with respect to said second device, when connected with at least one second device via said wired first communication interface. According to an embodiment of the present disclosure, the method comprises, when said first communication device is connected to a second device via said first communication interface and is configured as a master device, obtaining an identifier of said second device and operating in a first operating mode, compatible with a first power consumption, or in a second operating mode, leading to a second power consumption higher than said first power consumption, depending on said obtained identifier.

The first communication device is for instance a device that is adapted to interoperate with a second device compliant with a communication standard, like USB 2.0 or 3.0.

The terms "master" and "slave" used in the present disclosure (and also known respectively as "host" and "USB device" in some USB standard) refers to a model of communication between a "master" device and one or more "slave" device(s), where the "master" device has unidirectional control over the one or more "slave" device.

According to an embodiment of the present disclosure, the method comprises, when said first communication device is connected via said first communication interface to a power plug connected to the Mains, operating in said second operating mode.

According to an embodiment of the present disclosure, the method comprises, when said first communication device is connected to a second device via said first communication interface and is configured as a slave device, operating in said first operating mode.

According to an embodiment of the present disclosure, the method comprises detecting a connection with said second communication device when at least one pair of differential electric wires of said first communication interface are crossed by a current.

According to an embodiment of the present disclosure, said second operation mode leads to a power consumption of more than 4.5 Watts.

According to an embodiment of the present disclosure, said first power consumption is an upper limit of power consumption of said first communication device when operating in said first mode.

According to an embodiment of the present disclosure, said first wired interface is an interface adapted for interoperate with a device comprising a Universal Serial Bus (USB) interface.

According to an embodiment of the present disclosure, said first communication device comprises at least one wireless communication interface.

According to an embodiment of the present disclosure, said first communication device comprises at least one second wired communication interface.

According to an embodiment of the present disclosure, at least one of said second wired communication interface is adapted to receive and/or transmit a video stream.

According to an embodiment of the present disclosure, said second operation mode leads to a power consumption of more than 4.5 Watts.

According to an embodiment of the present disclosure, said first communication device comprises at least one wireless communication interface.

According to an embodiment of the present disclosure, said first communication device comprises at least one second wired communication interface.

According to an embodiment of the present disclosure, at least one of said second wired communication interface is adapted to receive and/or transmit a video stream.

According to another aspect, the present disclosure relates to a communication device comprising at least one wired first communication interface, said communication device being adapted to be powered via said first communication interface, and at least one processor adapted to configure said communication device as a master or as a slave device when said communication device is connected with at least one other device via said first wired communication interface.

According to an embodiment of the present disclosure, said at least one processor is adapted to:
  obtain an identifier of at least one other device, when said communication device is connected to said other device via said first communication interface and is configured as a master device, with respect to said at least one other device, and
  operate in a first operating mode, compatible with a first power consumption, or in a second operating mode, leading to a second power consumption higher than said first power consumption, depending of said obtained identifier.

According to an embodiment of the present disclosure, said at least one processor is adapted to operate in said second operating mode, when said communication device is connected via said first communication interface to a power plug connected to the Mains.

According to an embodiment of the present disclosure, said at least one processor is adapted to operate in said first operating mode, when said communication device is connected to another device via said first communication interface and is configured as a slave device, operating in said first operating mode.

According to an embodiment of the present disclosure, said at least one processor is adapted to detect a connection with said other device when at least one pair of differential electric wires of said first communication interface are crossed by a current.

According to an embodiment of the present disclosure, said second operation mode leads to a power consumption of more than 4.5 Watts.

According to an embodiment of the present disclosure, said first power consumption is an upper limit of power consumption of said communication device when operating in said first mode.

According to an embodiment of the present disclosure, said first wired communication interface is an interface adapted for interoperate with a device comprising a Universal Serial Bus (USB) interface.

According to an embodiment of the present disclosure, said communication device comprises at least one wireless communication interface.

According to an embodiment of the present disclosure, said communication device comprises at least one second wired communication interface.

According to an embodiment of the present disclosure, at least one of said second wired communication interface is adapted to receive and/or transmit a video stream.

While not explicitly described, the communication device of the present disclosure can be adapted to perform the method of the present disclosure in any of its embodiments.

According to an embodiment of the present disclosure, said communication device comprises at least one memory and at least one processing circuitry configured to:
  obtain an identifier of at least one other device, when said communication device is connected to said at least one other device via said first communication interface and is configured as a master device, with respect to said at least one second device, and
  operate in a first operating mode, compatible with a first power consumption, or in a second operating mode, leading to a second power consumption higher than said first power consumption, depending of said obtained identifier.

According to an embodiment of the present disclosure, said at least one processing circuitry is adapted to operate in said second operating mode, when said first device is connected via said first communication interface to a power plug connected to the Mains.

According to an embodiment of the present disclosure, said at least one processing circuitry is adapted to operate in said second operating mode, when said communication device is connected via said first communication interface to a power plug connected to the Mains.

According to an embodiment of the present disclosure, said at least one processing circuitry is adapted to operate in said first operating mode, when said communication device is connected to said at least one other device via said first communication interface and is configured as a slave device, with respect to said at least one other device, operating in said first operating mode.

According to an embodiment of the present disclosure, said at least one processing circuitry is adapted to detect a connection with said at least one other device when at least one pair of differential electric wires of said first communication interface are crossed by a current.

According to an embodiment of the present disclosure, said second operation mode leads to a power consumption of more than 4.5 Watts.

According to an embodiment of the present disclosure, said first power consumption is an upper limit of power consumption of said communication device when operating in said first mode.

According to an embodiment of the present disclosure, said wired first communication interface is an interface adapted for interoperate with a device comprising a Universal Serial Bus (USB) interface.

According to an embodiment of the present disclosure, said communication device comprises at least one wireless communication interface.

According to an embodiment of the present disclosure, said communication device comprises at least one second wired communication interface.

According to an embodiment of the present disclosure, at least one of said second wired communication interface is adapted to receive and/or transmit a video stream.

While not explicitly described, the communication device of the present disclosure can be adapted to perform the method of the present disclosure in any of its embodiments.

According to another aspect, the present disclosure relates to a communication system comprising a communication device of the present disclosure in any of its embodiments.

According to another aspect, the present disclosure relates to an electronic assembly comprising:
- a first communication device comprising at least one wired first communication interface, said first communication device being adapted to be powered via said first communication interface, and at least one processor, said at least one processor being adapted to configure said first communication device as a master or as a slave device when said first communication device is connected with at least one other device via said first wired communication interface;
- a second communication device;
- said first communication being adapted to equip said second electronic device.

According to an embodiment of the present disclosure, said at least one processor of said first communication device is adapted to:
- obtain an identifier of said second device, when said communication device is connected to said second device via said first communication interface and is configured as a master device, with respect to said second device, and
- operate in a first operating mode, compatible with a first power consumption, or in a second operating mode, leading to a second power consumption higher than said first power consumption, depending of said obtained identifier.

While not explicitly described, the first communication device of the electronic assembly of the present disclosure can be adapted to perform the method of the present disclosure in any of its embodiments.

Notably, in some embodiments, said at least one processor of said first communication device is adapted to operate in said second operating mode, when said first communication device is connected via said first communication interface to a power plug connected to the Mains.

While not explicitly described, the present embodiments related to a method or to the corresponding communication device, electronic assembly or system can be employed in any combination or sub-combination.

For example, some embodiments of the method of the present disclosure can involve:
- when said first communication device is connected to a second device via said first communication interface, being an interface adapted for interoperate with a device comprising a Universal Serial Bus (USB) interface, and is configured as a master device, with respect to said second device, obtaining an identifier of said second device and operating, depending on said obtained identifier, in a first operating mode, compatible with a first power consumption, or in a second operating mode, leading to a second power consumption, higher than said first power consumption, of more than 4.5 Watts;
- when said first communication device is connected via said first communication interface to a power plug connected to the Mains, operating in said second operating mode;
- when said first communication device is connected to a second device via said first communication interface and is configured as a slave device, with respect to said second device, operating in said first operating mode.

According to another aspect, the present disclosure relates to a non-transitory program storage product, readable by a computer.

According to an embodiment of the present disclosure, said non-transitory computer readable program product tangibly embodies a program of instructions executable by a computer to perform the method of the present disclosure in any of its embodiments.

According to an embodiment of the present disclosure, said non-transitory computer readable program product tangibly embodies a program of instructions executable by a computer for performing, when said non-transitory software program is executed by a computer, a method to be implemented in a first communication device adapted to be powered via a wired first communication interface and to be configured as a master or as a slave device when connected with at least one second device via said wired first communication interface, said method comprising:
when said first communication device is connected to a second device via said first communication interface and is configured as a master device, with respect to said second device, obtaining an identifier of said second device and operating in a first operating mode, compatible with a first power consumption, or in a second operating mode, leading to a second power consumption higher than said first power consumption, depending on said obtained identifier.

According to another aspect, the present disclosure relates to a computer readable storage medium carrying a software program comprising program code instructions for performing the method of the present disclosure, in any of its embodiments, when said non-transitory software program is executed by a computer.

According to an embodiment of the present disclosure, said computer readable storage medium tangibly embodies a program of instructions executable by a computer for performing, when said non-transitory software program is executed by a computer, a method, to be implemented in a first communication device adapted to be powered via a wired first communication interface and to be configured as a master or as a slave device when connected with at least one second device via said wired first communication interface, said method comprising, when said first communication device is connected to a second device via said first communication interface and is configured as a master device, with respect to said second device, obtaining an identifier of said second device and operating in a first operating mode, compatible with a first power consumption, or in a second operating mode, leading to a second power consumption higher than said first power consumption, depending on said obtained identifier.

5. LIST OF DRAWINGS

The present disclosure can be better understood, and other specific features and advantages can emerge upon reading the following description, the description making reference to the annexed drawings wherein.

It is to be noted that the drawings illustrate exemplary embodiments and that the embodiments of the present disclosure are not limited to the illustrated embodiments.

6. DETAILED DESCRIPTION OF THE EMBODIMENTS

At least one embodiment of the present disclosure offers a new way of powering a first communication device, like a peripheral device, that permits in some situations to increase the power consumption tolerated for the first communication device. Indeed, the present disclosure proposes a way for determining if a first communication device powered via a communication port is allowed to consume more than the maximum power consumption expected on this communication port. The communication port can notably be a communication port with connectors compatible with a communication standard and adapted for a communication of the first device with a second device compliant with this communication standard. Indeed, a consumption higher than the upper limit defined by the communication standard can be tolerated if the first device is powered by a second device being an independent power plug connected to the Mains, even if the independent power plug incorporates an USB to Ethernet adapting module of a specific vendor (for instance a module provided by the firm Technicolor). A higher power consumption cannot be tolerated at the opposite if the communication device is powered from an unknown device or is behaving as a slave device (and so if controlled in terms of communication by the second device playing the role of a master device) or if the second device is an independent power plug incorporating an USB to Ethernet adapting module of an unknown or not specific vendor.

Figure 1:
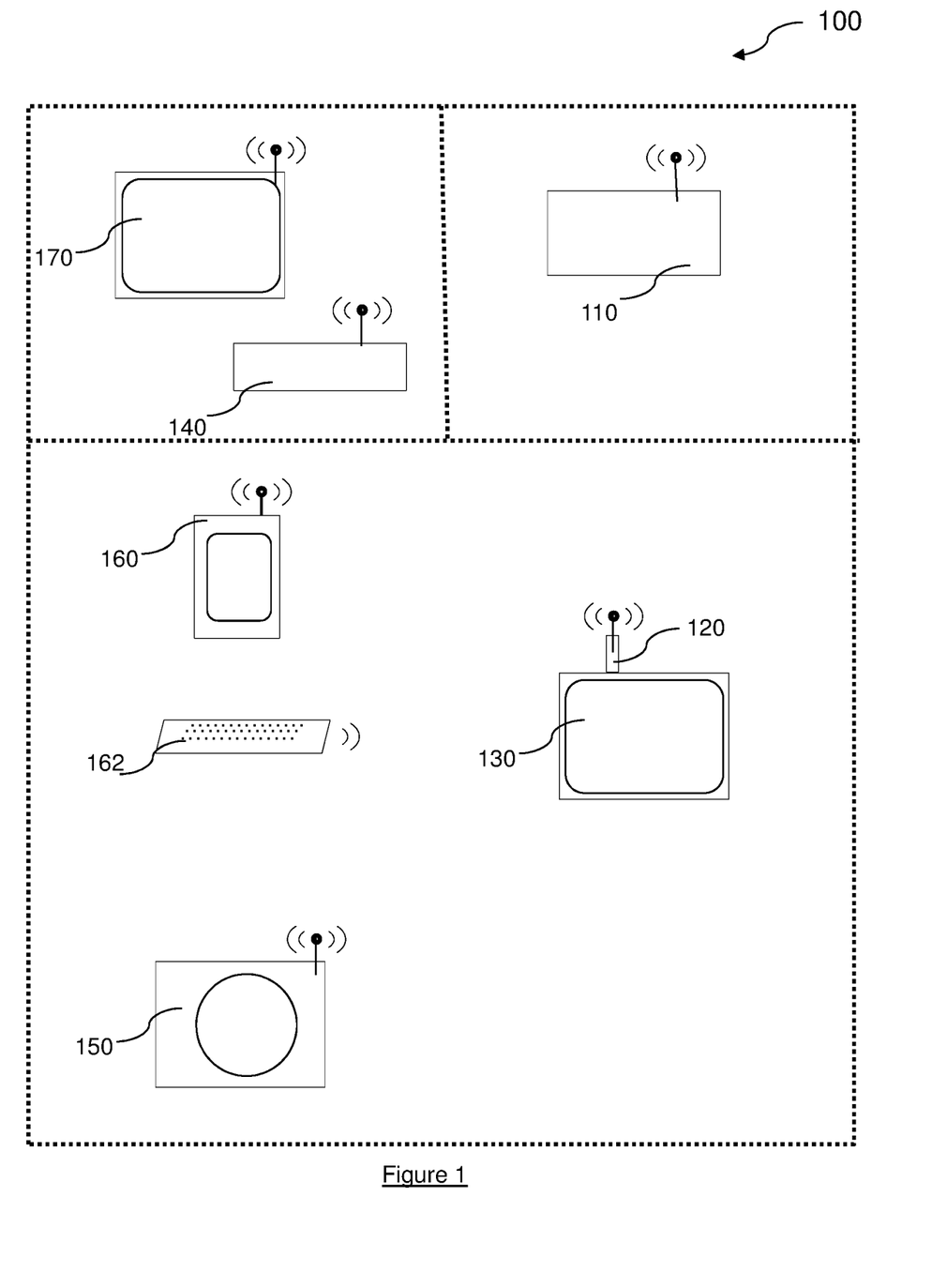
FIG. 1 shows an example of a system belonging to a wireless communication network according to a particular embodiment of the present disclosure.

A particular embodiment is now described, in link with a communication system 100 illustrated by FIG. 1.

In the embodiment illustrated by FIG. 1, the communication system 100 is located in a domestic environment. The communication devices of the system can exchange data inside a communication network, for instance a local area network (LAN), thanks to wired communication interfaces (like Ethernet interface) or wireless communication interfaces, like WIFI® or Bluetooth® interfaces.

The communication system can notably comprise one or several gateway(s) 110, giving access to at least one other communication network, like a Wide Area Network (WAN). Notably, the gateway 110 can give access to a Broadcast Network or to a Broadband Network, like the Internet Network. For instance, it can receive and/or transmit data from a broadcast network (for instance from TV operators) or from/to a broadband network like Internet. Thus, the devices of the system 100 can receive and/or transmit data, notably audiovisual data, via the gateway, from/to those other communication networks.

The communication system 100 can also include at least one other communication device, notably a communication device adapted to process an audiovisual signal, like a Set Top Box (STB) 140, a tablet 160, a PC, a smartphone, a Blue-ray player, a TV Set (130, 170), an/or an audio renderer 150.

In the embodiment illustrated in FIG. 1, the system can be distributed in different rooms of a house. For instance, the system can comprise a gateway (GW) 110 located in a first room, a first TV set 170 and a Set Top Box 140 located in a second room, and a second TV Set 130 located in a third room. The TV Set 130 can for instance be equipped with a communication device 120, for instance a peripheral device comprising audio and/or video processing capabilities (like HDMI capabilities) and/or wireless communication capabilities. Notably, as in the illustrated embodiment, the wireless communication means of the peripheral device can be adapted to the reception and/or the transmission of an audio and/or video stream.

For instance, the communication device 120 can be adapted to communicate with the gateway 110, in order to acquire a video stream from a Network external to the LAN network (for instance a video stream from the Internet or from a Video-On-Demand (VOD) site of a private Network). The peripheral device can also acquire a video stream from the STB 140, for instance a video stream stored locally on the STB or a video stream resulting from a decoding by the STB 140 of an encoded video stream received from the gateway 110. The communication device 120 can transmit the video stream to the TV Set 130 for its rendering.

In some embodiments, the communication device 120 can transmit wirelessly an audio stream (or an audio component of an audiovisual stream) to one or several audio processing devices, like an audio rendering device 150 as illustrated by FIG. 1. Of course, the figure has only an exemplary purpose and in some embodiments the communication device 120 can transmit different audio streams to different audio processing devices. For instance, the system can comprise an audio surround sub-system comprising different kinds of audio renderers (for instance a subwoofer and/or a satellite speaker), each kind of audio renderer being dedicated to the rendering of at least a part (defined according a frequency range for instance) of an audio signal.

In the particular embodiment of FIG. 1, the communication device 120 (also called herein "dongle") is connected, via one of its communication ports, to an USB port of the TV Set. The communication port of the peripheral device can be notably a communication port adapted for a communication of the peripheral device with another device (like the TV Set) compliant with an USB standard. Such a communication port adapted for an interoperation of the peripheral device with another device compliant with an USB standard, is called herein after for simplification purpose "a USB communication port".

The communication device 120 can be controlled by a user, either directly or through the TV Set, thanks to a remote-control device 162 or to an application running on a tablet 160.

Figure 2A:
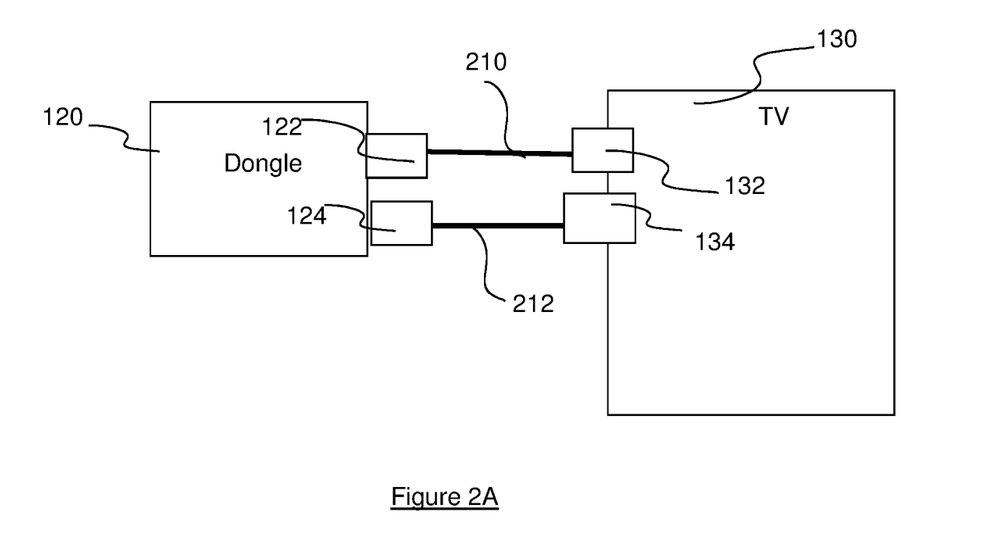
FIGS. 2A, 2B and 2C show exemplary configurations of the communication device 120 of FIG. 1.
Figure 2B:
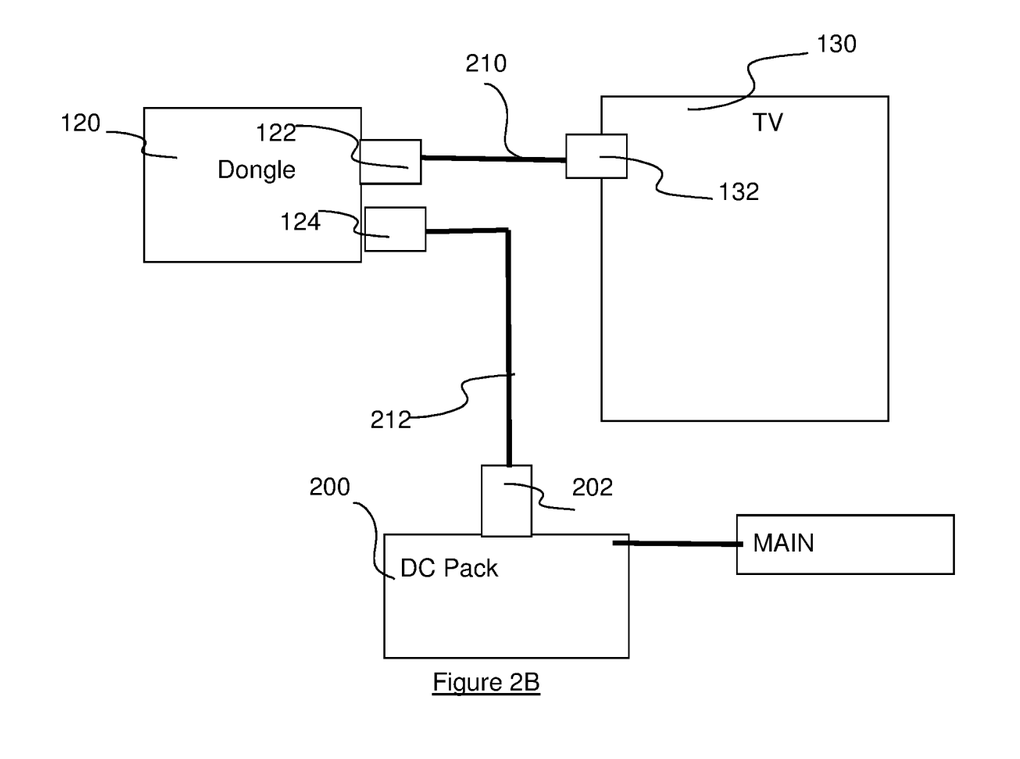
Figure 2C:
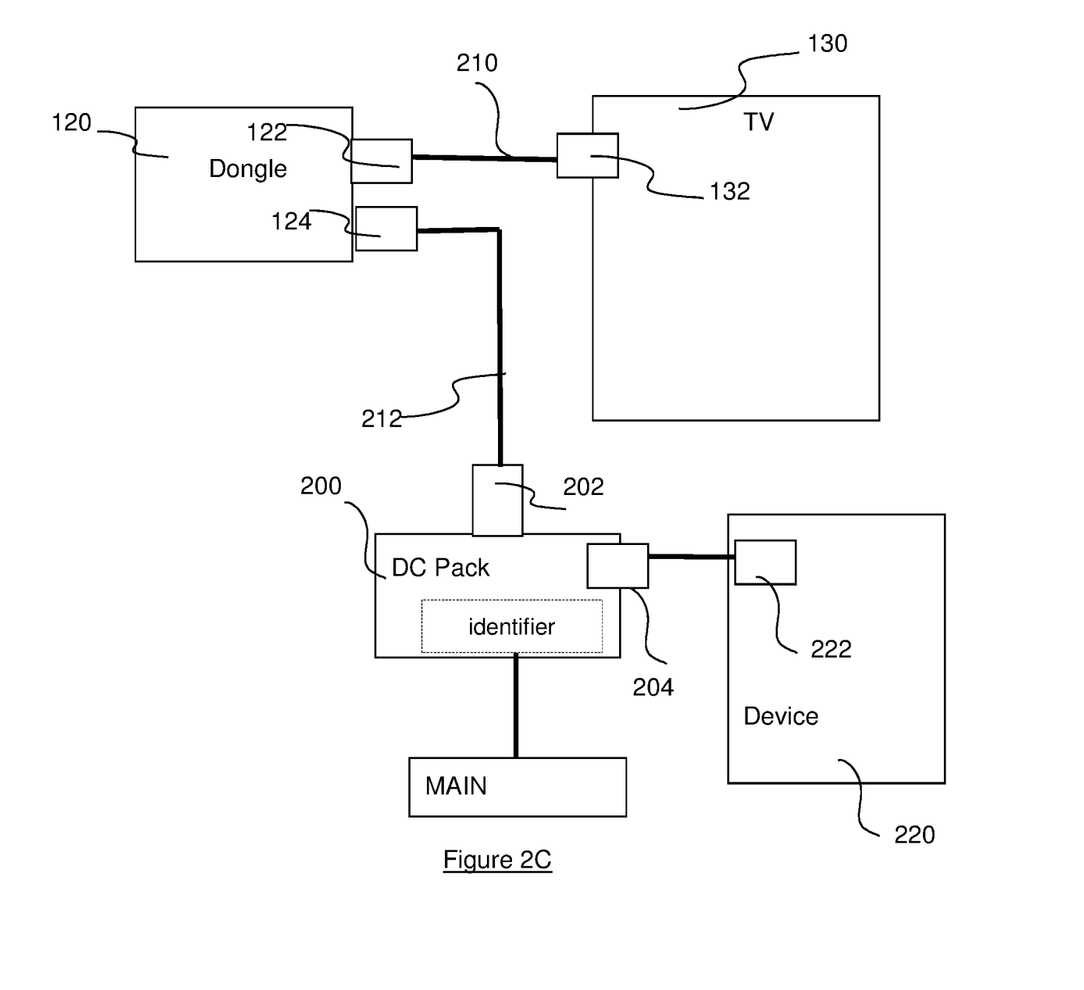

In the embodiments illustrated by FIGS. 2A, 2B and 2C, the communication device 120 can comprise at least two communication ports. A first communication port 122 (for instance an HDMI port) can permit to the communication device 120 to exchange video data with the TV Set 130.

A second communication port 124 can permit the powering of the communication device 120. Depending on the configuration of the system, the communication device 120 can be powered, via the second communication port 124, either by the TV Set 130 or by a DC power adaptor 200, for instance a power plug linked to the Mains. In a variant, the DC power adaptor connected to the second communication interface 124 can further enable communication with another device of the network, via an Ethernet communication interface for instance. In some embodiments, the communication port 124 can be adapted to permit a communication with a device compliant with communication standard, for instance an USB communication standard. Of course, depending upon embodiments, different types of communication ports can be used.

FIG. 2A illustrates a first configuration where the communication device 120 is powered by the TV Set 130. The second communication port 124 is connected via an USB cable 212 to an USB communication port 134 of the TV Set 130. The first HDMI communication port 122 is connected (directly or via an HDMI cable 210) to an HDMI communication port 132 of the TV Set 130.

FIG. 2B illustrates a second configuration similar to the configuration of FIG. 2A except that the communication device 120 is powered by an independent power plug, for instance a DC pack 200 connected to the Mains (with no other connectors than its communication port connected to the dongle and its connector linked to the Mains, as illustrated by FIG. 2B) The second communication port 124 is connected, via the USB cable 212 for instance, to an USB communication port 202 of the power plug 200.

FIG. 2C illustrates a third configuration similar to the configuration of FIG. 2A except that the communication device 120 is powered via a DC adaptor 200 connected to the Mains and further comprising an USB-Ethernet module, enabling the communication device 120 to communicate with another device 220 of the communication network via an Ethernet cable establishing a communication path between an Ethernet interface 222 of the other device 220 and the interface 204 of the DC adaptor 200. The second communication port 124 is connected, via the USB cable 212 for instance, to an USB communication port 202 of the DC adaptor 200.

Figure 3:
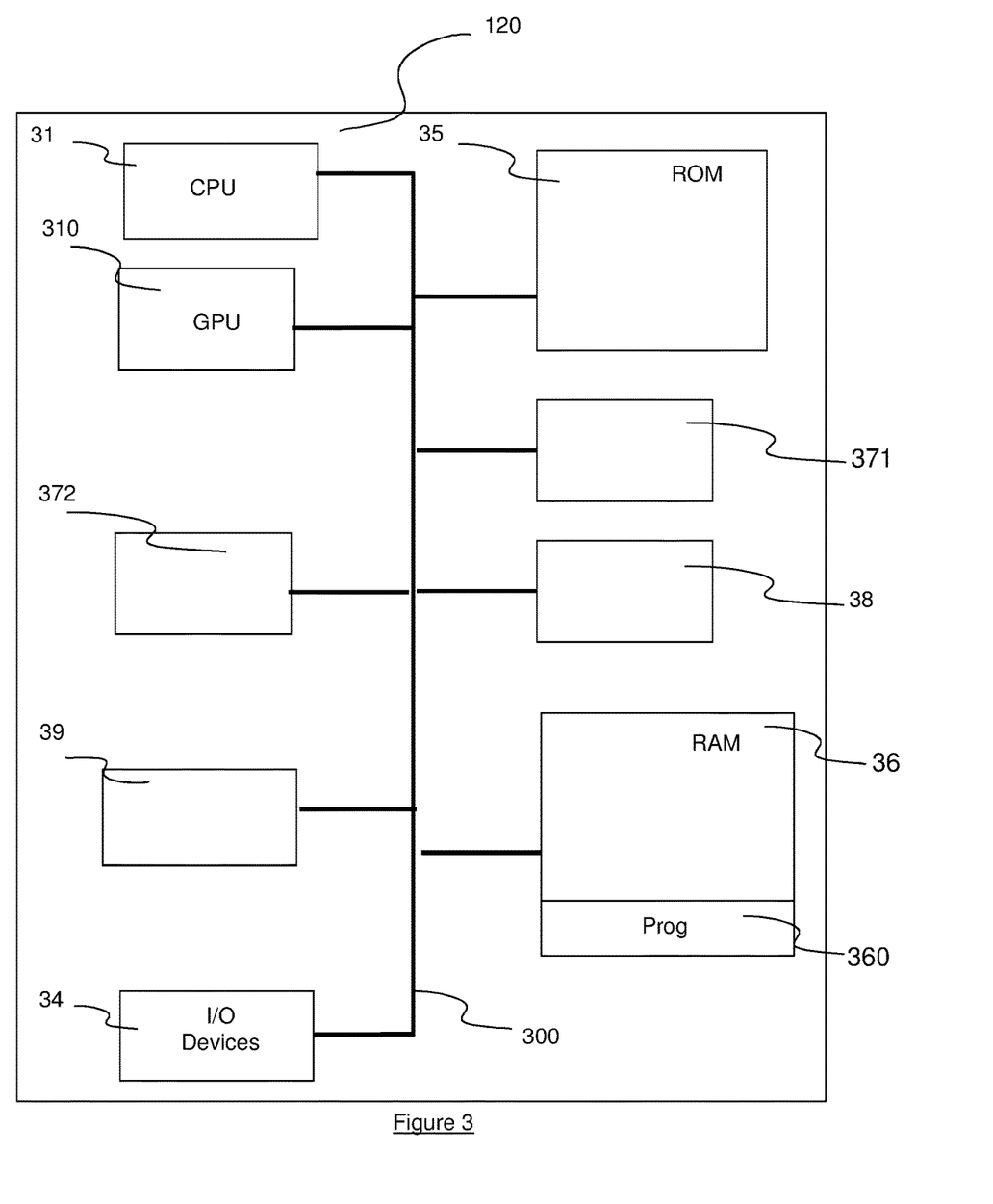
FIG. 3 illustrates an exemplary structure of the communication device 120 of FIG. 1.

FIG. 3 describes the structure of a communication device adapted to implement the method 600 of the present disclosure. It can be for instance a wireless communication device, like the HDMI dongle illustrated by FIG. 1, and FIGS. 2A to 2C.

In the particular embodiment of FIG. 3, the communication device 120 can include different devices (or modules), linked together via a data and address bus 300, which can also carry a timer signal. For instance, it can include one or several micro-processors 31, 310 (or Central Processing Units (CPU)), notably a Graphic Processing Unit (GPU) 310 (Optional), at least one Input/Output module 34, (like a tactile display, a switch, a led, a button, and so on), a ROM (or «Read Only Memory») 35, a RAM (or «Random Access Memory») 36, wired communication interface(s) (38, 39). One of the wired interface(s) can be for instance an HDMI interface, enabling reception and/or transmission of video data via the HDMI communication port 122 as illustrated by FIGS. 2A to 2C. One of the wired interface(s) for instance can be an interface adapted to permit an interoperability of the peripheral device with a USB compliant device and enabling powering of the dongle via the communication port 124 as illustrated by FIGS. 2A to 2C. In the illustrated embodiment, one of the wired interface(s) can be for instance an interface compatible for a communication with a second device compliant with a standard like USB 2.0.

In the illustrated embodiment, the peripheral device can also comprise at least one wireless communication interface 371, 372 (like WIFI or Bluetooth® interfaces), configured for the reception and/or transmission of data via a wireless connection. This wireless communication interface is optional.

Each of the mentioned memories can include at least one register, that is to say a memory zone of low capacity (a few binary data) or high capacity (with a capability of storage of a whole program or of all or part of data representative of data to be calculated or displayed).

When the peripheral device is powered on, via the communication port 124, by a power source (like the TV Set or an independent power plug) external to the peripheral device, the microprocessor 31 loads the program instructions 360 in a register of the RAM 36, notably the processes needed for performing at least one embodiment of the method described herein, and executes the program instructions.

According to a variant, the peripheral device includes several microprocessors.

The communication device 120 of the system is adapted to implement the method 600 of the present disclosure, in one of its embodiments.

In the particular embodiment illustrated in FIG. 3, the microprocessor 31 can be configured to:
  obtain an identifier of at least one other device, when said communication device is connected to said other device via said first communication interface and is configured as a master device, with respect to said at least one other device, and
  operate in a first operating mode, compatible with a first power consumption, or in a second operating mode, leading to a second power consumption higher than said first power consumption, depending of said obtained identifier.

Figure 5:
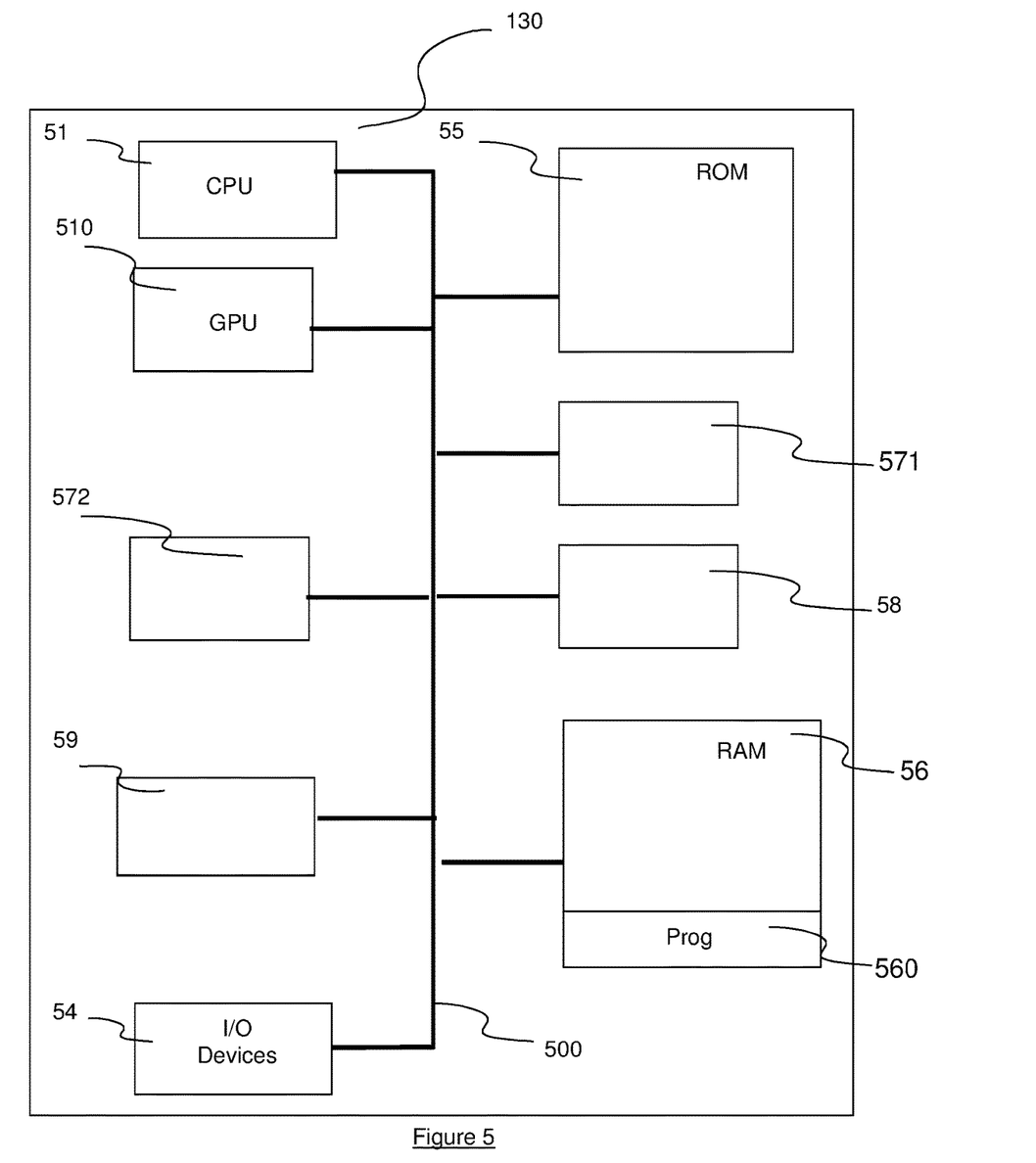
FIG. 5 illustrates an exemplary structure of the communication device 130 of FIG. 1.

FIG. 5 illustrates the structure of an electronic device like the TV set 130 illustrated by FIG. 1, on which the communication device 120 can be mounted, thus constituting an electronic assembly. In the particular embodiment of FIG. 7, the electronic device 130 can include different devices (or modules), linked together via a data and address bus 500, which can also carry a timer signal. It can include one or several micro-processors 5 1, 5 10 (or Central Processing Units (CPU)), for instance a Graphic Processing Unit (GPU) 310 (Optional)

The electronic device 130 can also include at least one Input/Output module 54, a ROM (or «Read Only Memory») 55, a RAM (or «Random Access Memory») 56, wired communication interface(s) (58, 59). One of the wired interface(s) can be for instance an HDMI interface, enabling reception and/or transmission of video data via the HDMI communication port of the TV Set 130. One of the wired interface(s) can be for instance an interface, enabling powering of the dongle via a communication port 124 of the dongle, like for instance an interface compatible for a communication with a second device compliant with a standard like USB 2.0 or USB 3.0.

In the illustrated embodiment, the electronic device 130 can also comprise at least one communication interface 571, 572 (like WIFI or Bluetooth® interfaces), configured for the reception and/or transmission of data via a wireless connection.

At least some of those communication interfaces are optional in some embodiments.

Each of the mentioned memories can include at least one register, that is to say a memory zone of low capacity (a few binary data) or high capacity (with a capability of storage of a whole program or of all or part of data representative of data to be calculated or displayed).

When the electronic device 130 is powered on, the CPU 51 loads program instructions stored in the ROM 55 in at least one register 560 of the RAM 56.

The electronic device 130 can also comprise a power source.

Figure 4:
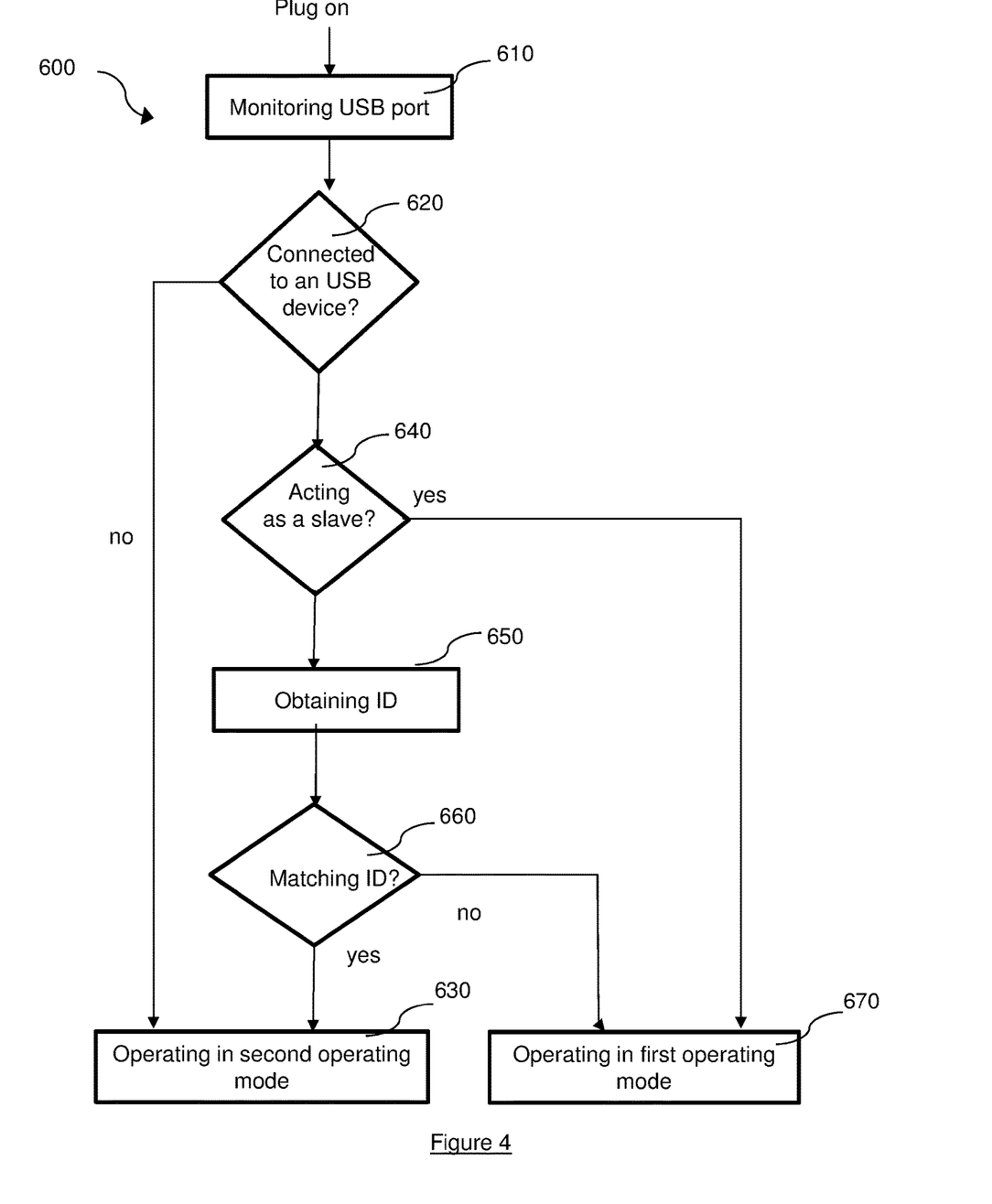
FIG. 4 illustrates an embodiment of the method of the present disclosure performed, for instance, in the communication device 120 of FIG. 1.

FIG. 4 shows a particular embodiment of the method 600 of the present disclosure, implemented in the communication device 120 of FIGS. 1,2A, 2B, 2C and 3.

According the illustrated embodiment, upon the powering up of the device (for instance by the plugging of the device), the method can comprise monitoring 610 the communication port 124 of the communication device 120, in order to determine if another device is connected to the dongle via the communication port (620).

In the particular embodiment illustrated, where the communication port 124 is a communication port adapted to permit a communication with a device compliant with an USB standard and having notably a hardware compatible with the USB standard, the monitoring 610 can notably comprise determining if the USB D+/D− differential pair of the communication port 124 is crossed by a current. Indeed, when this differential electric pair is used, a device can be assumed to be connected via the communication port 124. At the opposite, when the device is powered through the USB interface with the differential pair not being used, it can be assumed that an independent power plug, directly connected to the Mains, is connected to the communication port 124 as illustrated by FIG. 2B.

In the illustrated embodiment, the communication device 120 is a device that can be configured dynamically either in a master (also called "Host") role or in a slave (or so called "device") role, regarding another device connected via the communication port 124.

When the device is assumed to be connected to another device via the USB communication port 124, the method can comprise determining if the communication device 120 is configured as a slave or as a master (640). In some embodiments, the device can wait for a given period of time for receiving an order coming from the communication interface 124 to behave as a slave or as a master.

The determining can be performed differently depending upon embodiments. Notably, it can be performed in a way adapted for an interoperating with a device compliant with an USB Standard, for instance to the USB 2.0 standard.

In the embodiment illustrated, the USB D+/D− differential pair of a communication port are associated with resistors that can be activated either in pull-down or pull-up mode. In such an embodiment, the determining of a configuration of the complementary device as a master or a slave can take into account the values of the resistors associated with the USB D+/D− differential pair.

For instance, if the other device 220 has positioned D+ and D− resistors in pull-down mode, the determining can resume with the complementary communication device 120 being configured as a slave device. If the other device has only positioned D− resistors in pull-down mode, the determining can resume with the communication device 120 being configured as a master (or host) device.

In the particular embodiment illustrated, the dongle has an operating system (OS) of Android type. When the connected other device acts as a master (or host) device, the interface of the dongle can for instance generate the following event:
android_work: sent uevent USB_STATE=CONNECTED.

The dongle is determined as acting as a master (or host) device, when the interface of the dongle can generate the following event for instance:
iD/UsbHostManager (1683): Added device If the communication device 120 is determined to be a slave, the method can comprise operating 670 the communication device 120 in a first operating mode, compatible with the constraints brought by the communication standard potentially used by the master device. Notably, in the illustrated embodiment, where the communication port is adapted for an interoperating with another device equipped with an USB port, the power consumption of the complementary device must stay below an upper limit defined by the USB standard. For instance, the first operating mode must permit the complementary device to have a power consumption (for instance a peak value) staying less than 4.5 W.

In the illustrated embodiment, when the communication device 120 is the master device, it is checked if the communication device 120 is communicating with a specific USB module, adapted to support a power consumption higher than the upper limit of the first operating mode. Such a USB module can be for instance a USB_Ethernet adapting module comprised in a DC pack 200 also linked to the Mains as illustrated by FIG. 3 and further connected to a third device 220 via an Ethernet interfaces 204, 222. The method can thus comprise obtaining 650 an identifier of the USB module connected via the communication port 124. Such an identifier can be comprised for instance in a flash memory accessible by the USB module of the DC pack illustrated by FIG. 3. In some embodiment, the identifier can be obtained in response to an USB BUS ENUMERATION command emitted by the communication device 120 via the communication port 124. For instance, the response obtained from the communication port 124 to an USB BUS ENUMERATION message can contain the following information:
UsbDevice[mName=/dev/bus/usb/002/002,mVendorId=4567,mProductId=13701,mClass=255,mSubclass=255,mProtocol=0,mManufacturerName=TCH, mProductName=TCH00001,mSerialNumber=9999,mConfigurations
Manufacturer=TECHNICOLOR.
product=TCH00001
idVendor=11D7
idProduct=3585

According to FIG. 4, the method can comprise determining a matching 660 of the obtained identifier ID. The method can notably comprise comparing the obtained identifier with at least one specific comparative pattern. Such a pattern can be stored on a memory of the communication device 120 or obtained by the complementary device from a remote location. For instance, in some embodiments, upon being powered up, the complementary device can start operating in a first operating mode, fulfilling an upper limit of power consumption (for instance a limit required by a communication standard), and use its wireless interface and the gateway of the communication system to access through the internet to a site of the manufacturer of the complementary device, giving identifier of at least one specific device (for instance a proprietary device) able to operate with a high level of power, higher than the upper limit associated with the first operating mode.

Depending upon embodiments, the obtained identifier can be considered as matching a pattern when it is strictly identical to the pattern, or when the pattern is part of the identifier. Such an embodiment can permit to detect matching of a pattern being an alphanumeric value representing a given type of device with an identifier, constructed as a concatenation of the alphanumeric value with a serial number of the manufactured connected USB device.

When the obtained identifier can be matched with a specific pattern, the method can comprise operating 630 in a second operating mode, in which it is allowed (or in other words possible) for the communication device 120 to consume more power than the upper limit of the first operating mode. In some embodiments, no power consumption limit needs to be respected in the second operating mode. In some other embodiments, an upper limit needs to be respected in the second operating mode, this upper limit being higher than the upper limit to be respected in the first operating mode.

For instance, in some embodiments, the upper limit to be respected in the first operating mode can be a power limit value between 2.5 W to 4.5 W (for instance 2.5 W, 3 W, 3.5 W, 4 W or 4.5 \N) and the upper limit to be respected in the second operating mode can be a power limit value between 4.5 W to 7 W (for instance 4.6 W, 5 W, 5.5 W, 6 W, 6.5 W, 7 W).

When the obtained identifier cannot be matched with a specific pattern, the method can comprise operating 670 in the first operating mode.

In a variant, the method can comprise comparing the identifier with different patterns, at least one value of a low and/or upper limit of power consumption being associated with each pattern, and operating the device at one of several second operating modes, each of the several second operating modes being associated when at least one of the limit values of power consumption.

When the complementary device is assumed to be connected to a power plug, the method can comprise operating 630 the complementary device in a second operating mode. In the illustrated embodiment, the second operating mode is a high-performance mode, where the complementary device may consume more power than the maximum power consumption authorized for a device compliant with the USB standard. Indeed, the complementary device is assumed to be powered by a vendor proprietary power plug, capable of providing more power than a classical USB device.

In the embodiment of FIG. 1, for instance, in the high-performance mode, the device is allowed to use more CPU units than in the first operating mode. Thus, the device can provide services more efficiently and/or friendlier to a user. In another embodiment, the device can be allowed to use a Graphical Processing Unit (GPU), thus offering a friendlier interface to a user. Such embodiments can thus help improving a user experience.

At the opposite, for instance, the first operating mode (with a power consumption upper limit), can induce some constraints during the operating of the device, in order to limit its power consumption. For instance, only a limited number of the CPU units of the dongle are allowed to be used together for its operating. For instance, only 2 CPU units amongst the 4 CPU units of the device are allowed to be used at the same time. Some processing means can also be disabled. For instance, in some embodiments, if a GPU is currently used, the GPU can be disabled.

The present disclosure has been described in relation with a particular protocol. Of course, as it can be understandable for a person skilled in the art, the present disclosure can also be applied in a communication system using other communication protocols, notably communication protocol not related to USB or HDMI standards.

As can be appreciated by one skilled in the art, aspects of the present principles can be embodied as a system, method, or computer readable medium. Accordingly, aspects of the present disclosure can take the form of a hardware embodiment, a software embodiment (including firmware, resident software, micro-code, and so forth), or an embodiment combining software and hardware aspects that can all generally be referred to herein as a "circuit", "module" or "system". Furthermore, aspects of the present principles can take the form of a computer readable storage medium. Any combination of one or more computer readable storage medium may be utilized.

A computer readable storage medium can take the form of a computer readable program product embodied in one or more computer readable medium and having computer readable program code embodied thereon that is executable by a computer. A computer readable storage medium as used herein is considered a non-transitory storage medium given the inherent capability to store the information therein as well as the inherent capability to provide retrieval of the information therefrom. A computer readable storage medium can be, for example, but is not limited to, an electronic, magnetic, optical, electromagnetic, infrared, or semiconductor system, apparatus, or device, or any suitable combination of the foregoing.

It is to be appreciated that the following, while providing more specific examples of computer readable storage media to which the present principles can be applied, is merely an illustrative and not exhaustive listing as is readily appreciated by one of ordinary skill in the art: a portable computer diskette, a hard disk, a read-only memory (ROM), an erasable programmable read-only memory (EPROM or Flash memory), a portable compact disc read-only memory (CD-ROM), an optical storage device, a magnetic storage device, or any suitable combination of the foregoing.

Thus, for example, it can be appreciated by those skilled in the art that the block diagrams presented herein represent conceptual views of illustrative system components and/or circuitry of some embodiments of the present principles. Similarly, it can be appreciated that any flow charts, flow diagrams, state transition diagrams, pseudo code, and the like represent various processes which may be substantially represented in computer readable storage media and so executed by a computer or processor, whether or not such computer or processor is explicitly shown.

The invention claimed is:

1. A method to be implemented in a first communication device adapted to be powered via a wired first communication interface of said first communication device and to be configured as a master device or as a slave device for exchanging data with at least one second communication device via said wired first communication interface of said first communication device, said method comprising, when said first communication device is connected to a second communication device via said first communication interface and is configured as a master device, with respect to said second communication device:
   obtaining a product identifier of a third communication device interconnecting said first communication interface of said first communication device with a second communication interface of said second communication device; and
   operating in a first operating mode, compatible with a first power consumption, or in a second operating mode, leading to a second power consumption higher than said first power consumption, depending on said obtained product identifier.

2. The method according to claim 1 comprising, when said first communication device is connected via said first communication interface to a power plug only connected to a Mains and to said first communication device, operating in said second operating mode.

3. The method according to claim 1 comprising, when said first communication device is connected to a second communication device via said first communication interface and is configured as a slave device with respect to said second communication device, operating in said first operating mode.

4. The method according to claim 1 wherein said second operation mode leads to a power consumption of more than 4.5 Watts.

5. The method according to claim 1 wherein said first communication device comprises at least one second wired communication interface adapted to receive and/or transmit a video stream.

6. A first communication device comprising a wired first communication interface, said first communication device being adapted to be powered via said first communication interface, and at least one processor adapted to configure said first communication device as a master device or as a slave device for exchanging data with at least one second communication device via said wired first communication interface, said at least one processor being adapted to, when said communication device is connected to at least one second communication device via said first communication interface and is configured as a master device with respect to said at least one second communication device:
  obtain a product identifier of at least one third communication device interconnecting said first communication interface of said first communication device with a second communication interface of said second communication device, and
  operate in a first operating mode, compatible with a first power consumption, or in a second operating mode, leading to a second power consumption higher than said first power consumption, depending on said obtained product identifier.

7. The first communication device according to claim 6 wherein said at least one processor is adapted to operate in said second operating mode, when said communication device is connected via said first communication interface to a power plug only connected to a Mains and to said first communication device.

8. The first communication device according to claim 6 wherein said at least one processor is adapted to operate in said first operating mode, when said communication device is connected to a second device via said first communication interface and is configured as a slave device with respect to said second communication device.

9. The first communication device according to claim 6 wherein said second operation mode leads to a power consumption of more than 4.5 Watts.

10. The first communication device according to 6 wherein said first communication device comprises at least one wireless communication interface.

11. The first communication device according to claim 6 wherein said first communication device comprises at least one wired second communication interface adapted to receive and/or transmit a video stream.

12. An electronic assembly comprising:
  a first communication device comprising a wired first communication interface, said first communication device being adapted to be powered via said first communication interface, and at least one processor;
  at least one second communication device;
  at least one third communication device interconnecting said first communication interface of said first communication device and at least one second communication interface of said at least one second communication device; and
  said at least one processor being adapted to configure said first communication device as a master device or as a slave device for exchanging data with said at least one second communication device via said wired first communication interface;
  a fourth communication device;
  said first communication device being adapted to equip said fourth communication device, and
  said at least one processor of said first communication device being adapted to, when said first communication device is connected to said at least one second communication device via said first communication interface and is configured as a master device with respect to said at least one second communication device:
    obtain a product identifier of said third communication device; and
    operate in a first operating mode, compatible with a first power consumption, or in a second operating mode, leading to a second power consumption higher than said first power consumption, depending on said obtained product identifier.

13. The electronic assembly according to claim 12 wherein said at least one processor of said first communication device is adapted to operate in said second operating mode, when said first communication device is connected via said first communication interface to a power plug only connected to a Mains and to said first communication device.

14. A non-transitory computer readable program product comprising program code instructions to enable a computer to perform a method according to claim 1 when loaded into and executed by the computer.

15. The method of claim 1 wherein said product identifier is comprised in a flash memory accessible by the third communication device.

16. The method of claim 15 wherein said product identifier is obtained in response of a command emitted by the first communication device via the wired first communication interface.

17. The communication device of claim 6 wherein said product identifier is comprised in a flash memory accessible by the third communication device.

18. The communication device of claim 17 wherein said product identifier is obtained in response of a command emitted by the first communication device via the wired first communication interface.

19. The method of claim 1 comprising:
  upon powering up said first communication device, operating said first communication device in said first operating mode;
  and wherein the method comprises operating said first communication device in said second operating mode upon matching said obtained product identifier of said third communication device with another product identifier obtained via a wireless interface of said first communication device.

20. The method of claim 1, wherein said third communication device is a power plug that incorporates an adapting module adapted to interconnect said first communication interface and said second communication interface.

21. The electronic assembly according to claim 12, wherein said fourth communication device is a TV set.

* * * * *